Dec. 17, 1957  W. I. BUDINGTON ET AL  2,816,463
AUTOMATIC BALANCING SYSTEM
Filed June 19, 1953

INVENTORS
William I. Budington and
Sheldon I. Rambo
BY
Paul E. Friedemann
ATTORNEY

United States Patent Office 2,816,463
Patented Dec. 17, 1957

2,816,463

AUTOMATIC BALANCING SYSTEM

William I. Budington, Catonsville, and Sheldon I. Rambo, Baltimore, Md., assignors to Westinghouse Electric Corporation, East Pittsburgh, Pa., a corporation of Pennsylvania Application June 19, 1953, Serial No. 362,802

7 Claims. (Cl. 77—5)

This invention relates to balancing machines for balancing rotating masses, such as crank shafts.

Present balancing systems rely upon the operator to manually perform many of the balancing functions, such as nulling an indicating instrument to ascertain the amount of rotor material to be removed from the rotating mass and the position from which it is to be removed in order to balance the rotor. This operation is usually accomplished by manually adjusting the tap on a potentiometer until the indicating instrument reads zero, and the motion of the tap is then transferred by some means to an automatic drill press to control the depth of the hole drilled in the rotating mass and thus the amount of metal removed.

For production line balancing, it is desirable to have all of the operations performed automatically. Fully automatic operation performs the balancing faster and eliminates human errors.

Accordingly, it is an object of this invention to provide means for determining the unbalance of a rotating mass automatically.

A more specific object of this invention is to provide a system for determining the unbalance of a rotating mass and balancing the rotating mass automatically.

Figure 1:
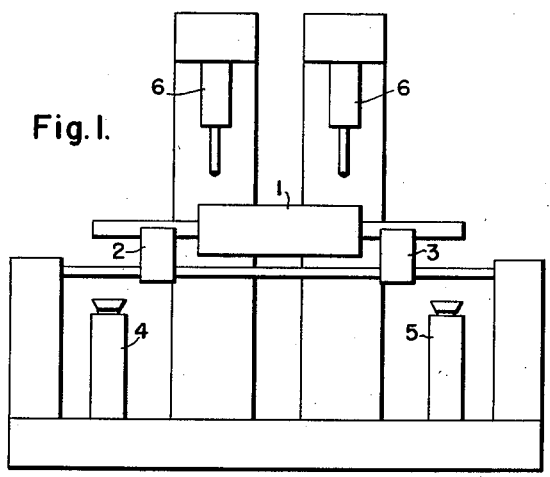
Figure 2:
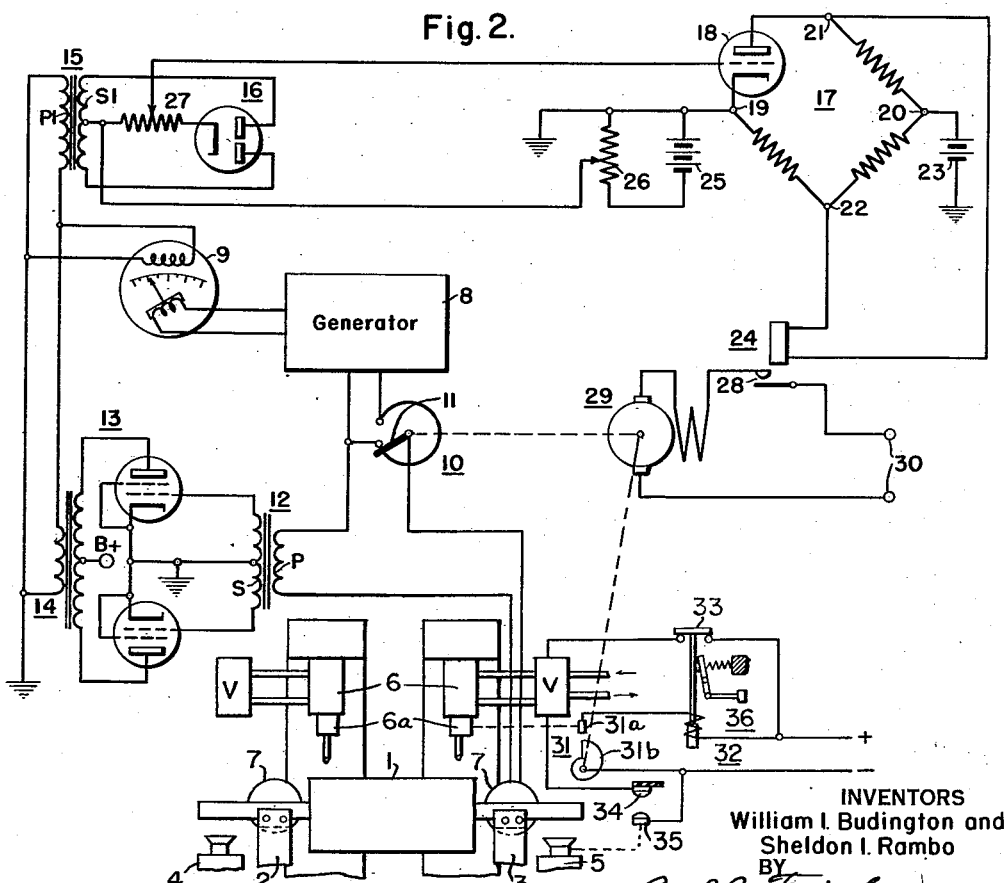

The objects stated are merely illustrative. Other objects and advantages will become more apparent from a study of the following specification and drawings, wherein:

Figure 1 shows, schematically, a mechanical setup which might employ the invention; and, Fig. 2 shows a diagrammatical view of a preferred scheme for automatically nulling the indicating instrument.

With specific reference to the schematic representation of the mechanical elements shown in Fig. 1 which might embody the present invention, the numeral one represents the rotating mass which is to be balanced. The mass 1 is mounted in bearings 2 and 3 for free oscillatory motion in a horizontal plane. Upon determining the amount of material necessary to be removed from the rotating mass 1 and the position from which it is to be removed to balance the rotating mass 2, jacks 4 and 5, which may be hydraulically operated, are utilized to lift the rotating mass from its bearings 2 and 3 so that the automatic drill presses 6 may remove the proper amount of material from the proper positions. It may be necessary to perform the operation several times to balance the rotor.

Normally, the material may be removed from the rotating mass at the heavy spot for balancing but for some applications it is necessary to remove components of weight from locations on each side of the heavy spot. An example of such an operation occurs in balancing crank shafts which is illustrated here although the invention is not limited thereto. Generally in balancing crank shafts the positions from which weight can be removed are limited to the counterweight and this operation is required on each end of the crank shaft.

In Fig. 2, the workpiece is also designated by the numeral 1 and the bearings for the rotating mass are designated by the numerals 2 and 3. A pickup 7 is provided for generating a voltage which is determined by the vibration of the rotating mass and thus is an indication of the unbalance. A generator 8 is provided for generating a voltage of the same frequency as the voltage generated by the pickup 7 and of a sinusoidal form. Part of the output of the generator 8 is supplied to the current coil of an indicating instrument 9 of the wattmeter type so that the wattmeter effectively filters out all vibration harmonics except that corresponding to running frequency. Another part of the output of the generator 8 is applied to the input terminals of a potentiometer 10 which has a tap 11 capable of 360° rotation. A portion of the voltage tapped off the potentiometer 10 by the tap 11 is placed in series with the voltage from pickup 7 and the primary P of a coupling transformer 12. The voltage tapped off the potentiometer 10 is 180° out of phase with the voltage from the pickup 7 so that when the voltage tapped off the potentiometer 10 is of the same magnitude as the voltage generated by the pickup 7, no voltage appears across the primary P of the transformer 12.

Since the application of the invention illustrated is utilized to balance crank shafts and the correction is made at fixed locations, means is not provided to determine the phase of unbalance of the rotor. For other applications where it is necessary to determine the location of the high spot on the rotor, means well known in the art may be provided to indicate the position with respect to a given reference when the voltage from the generator is adjusted to be 180° out of phase with the voltage from the pickup 7.

An amplifier 13 is provided to amplify the signal from the transformer 12 which is due to a difference in magnitude of the voltage from the pickup 7 and the voltage tapped off the potentiometer 10. The signal from the amplifier 13 is fed to the voltage coil of the indicating instrument 9 through the transformer 14. Any signal which is supplied to the voltage coil of the indicating instrument 9 is also supplied to the primary P1 of the transformer 15. The secondary S1 of the transformer 15 supplies a fullwave rectifier 16 which may be of any common type.

A Wheatstone bridge 17 has a vacuum tube 18 in one leg. The bridge 17 is designed to be balanced when the tube 18 conducts. The bridge 17 has input terminals 19 and 20 and output terminals 21 and 22. The input terminals are supplied from the battery 23. A relay 24 has its coil connected across the output terminals 21 and 22 of the bridge 17, and the coil is not energized as long as the vacuum tube 18 conducts and the bridge 17 is balanced. The grid bias for the tube 18 is supplied by a battery 25 and is adjusted by the taps on the potentiometers 26 and 27. The grid bias of the tube 18 is adjusted so that the tube will conduct when there is no voltage on the secondary S1 of the transformer 15 (i. e. when there is no voltage supplied to the voltage coil of the indicating instrument 9). When there is a voltage supplied to the voltage coil of the indicating instrument 9, and consequently, a voltage on the secondary S1 of the transformer 15, the rectifier 16 causes a direct current voltage on the potentiometer 27 which changes the bias on the grid of the vacuum tube 18 and thus biases the tube 18 to cut off. Under these conditions, the bridge 17 is unbalanced, and a current flows in the coil of the relay 24 connected across the output terminals 21 and 22 of the bridge 17. When the coil of the relay 24 is energized, its armature is picked up to close the contacts 28 and thus cause the servomotor 29 to be energized from an alternating current source which is supplied at the terminal 30.

The rotor of the servomotor 29 is mechanically coupled to the tap 11 of the potentimeter 10 and, therefore, when the motor is energized and rotates, the position of the tap 11 is changed accordingly to vary the voltage tapped off of the potentiometer 10. When the voltage tapped off the potentiometer 10 is equal to the voltage generated by the pickup 7, no voltage appears on the primary P of the transformer 12 and, therefore, no voltage is supplied to the voltage coil of the indicating instrument 9 or the primary P1 of the transformer 15. As a consequence, the rectifier 16 has no voltage to rectify and the grid bias of tube 18 is such that the tube conducts, the bridge 17 is balanced and no current flows through the coil of the relay 24 and, therefore, the contacts 28 are opened and the servomotor 29 is not energized.

The circuit just described is utilized in the automatic balancing machine as follows. If the rotating mass 1 is perfectly balanced, the pickup 7 does not generate a voltage, but a voltage may be tapped off of the potentiometer by the tap 11 in which case that voltage will appear across the primary P of the transformer 12. It will be amplified by the amplifier 13 and applied to the voltage coil of the indicating instrument 9 and the primary P1 of the transformer 15. Under these conditions, as has already been described, the indicating instrument 9 will give an indication according to the magnitude of the voltage applied to the primary P of the transformer 12, and the bridge 17 will be unbalanced so that the servomotor 29 will operate the tap 11 of the potentiometer 10 counterclockwise. This condition will prevail until the servomotor 29 drives the tap 11 to the extremity of the potentiometer 10, the position shown, where no voltage will be tapped off the portion of the potentiometer 10 which is in series with the voltage supplied by the pickup 7. At this point, no voltage will appear on the voltage coil of the indicating instrument 9 and it will be nulled, the bridge will be balanced, and the servomotor 29 will not be energized. If then an unbalanced rotating mass is substituted, then the pickup 7 will generate a voltage, and thus the voltage coil of the indicating instrument 9 will be energized and the indicating instrument 9 will indicate the magnitude of the unbalance voltage generated by the pickup 7. The bridge 17 will be unbalanced for the reasons previously described and the servomotor 29 will drive the tap 11 on the potentiometer 10 counterclockwise until the voltage tapped off the potentiometer 10 is equal in magnitude to the voltage generated by the pickup 7 to null the indicating instrument 9 and rebalance the bridge 17. The movement of the tap 11 of the potentiometer 10 required to null the indicating instrument 9 is an indication of the magnitude of the unbalance of the rotating mass to be balanced. Therefore, the motion of the tap 11 may be transferred by means well known in the art to an automatic drill press to control the depth of the hole drilled in the rotating mass by the drill press, and thus the amount of material removed from the rotating mass. In Fig. 2, the means for transferring motion is shown as a cam switch 31 having a contact 31a mechanically coupled to the housing 6a of the drill press spindle to move vertically with the housing and having a cam-shaped contact 31b driven counterclockwise by the servomotor 29.

As illustrated in Fig. 2 the positioning means for the housings 6a are hydraulically operated, being respectively controlled by two position spring loaded solenoid operated valves V. The details of these valves are not shown since they may be conventional. These valves are preferably connected to a supply of hydaulic fluid represented by the arrows adjacent the valves so that in their spring loaded position the spindles are retracted and when the valve solenoid is energized the spindles are extended.

The angular position of motor driven cam switch 31b determines the distance separting contacts 31a and 31b when the spindle is retracted which is used to control the distance the spindle travels downwardly. In accomplishing this, contacts 31a and 31b are connected to energize the coil of a relay 32, the normally closed contacts 33 of which are connected in series in the solenoid valve circuit. This circuit is further controlled by a set of normally open contacts comprising stationary contact 34 and movable contact 35, which latter is moved by hydraulic jack 5. By this latter expedient the spindles are maintained retracted until the jacks lift workpiece from bearings 2 and 3, at which time contact 35 engages contact 34 completing the solenoid valve circuit which lowers the spindle.

Downward movement of the spindle ceases when contact 31a engages cam-shaped contact 31b which energizes relay 32. Contact 33 now opens the solenoid valve circuit and the valve is restored to its spring loaded position. Relay 32 may be provided with a resettable spring loaded latch 36 to hold contacts 33 open during retracting movement of the spindle.

For convenience and simplification, the diagrammatic showing of Fig. 2 shows the use of only one pickup device 7 interconnected with the rest of the circuitry whereas in practice, the balancing operation would be performed more accurately and faster by utilizing a pickup device at each end of the rotating mass 1 and combining them in a network such as is shown and described in detail in Patent 2,315,578 by John G. Baker, issued April 6, 1943, entitled Apparatus for Balancing and Patent 2,165,024 by F. C. Rushing and John G. Baker, issued July 4, 1939, entitled Indicating Balancing Machine. The purpose of the network is to balance a portion of one pick-up voltage against the other so that the resultant output voltage from the network will represent the unbalance of the rotor in an arbitrarily selected plane transversely disposed of the rotor axis.

It will be recognized that the objects of the invention have been achieved by providing a means by which the unbalance of a rotating mass is determined, the indicating instrument which indicates the unbalance of a rotating mass is automatically nulled, and the mass is balanced automatically.

While in accordance with the patent statutes, one best known embodiment of the invention has been illustrated and described in detail. It is to be particularly understood that the invention is not limited thereto or thereby, but that equivalents are clearly within the inventive scope.

We claim as our invention:

1. In a balancing machine for a rotatable body, the combination of, bearing means rotatably supporting said body for vibratory movement in a single plane, an electrical pickup disposed to respond to vibratory movement of said bearing means in said single plane for generating an alternating current unbalance voltage proportional to the oscillation of the rotatable body, adjustable generator means for producing a reference voltage of the same frequency as said unbalance voltage, electrical means connected to said pickup and said generator means for comparing the magnitudes of said reference and unbalance voltages and producing a resultant voltage, servo means responsive to said resultant voltage for adjusting the magnitude of the reference voltage to be substantially equal to the unbalance signal, a machine for performing an operation upon said rotatable body, and means operated by said servo means for controlling said machine.

2. In a balancing machine for a rotatable body, the combination of, bearing means rotatably supporting said body for vibratory movement in a single plane, an electrical pickup disposed to respond to vibratory movement of said rotatable body in said single plane for generating an alternating current unbalance voltage proportional to the oscillation of said rotatable body, generator means for producing a reference voltage of the same frequency as said unbalance voltage, electrical means connected to said pickup and said generator means for comparing the magnitudes of the reference and unbalance voltages and producing a resultant voltage, servo means responsive to said resultant voltage for adjusting the reference voltage to equal the unbalance voltage, and a machine disposed to perform an operation on said body and having a control element connected to and operated by said servo means.

3. In a balancing machine for a rotatable body, the combination of, bearing means rotatably supporting said body for vibratory movement in a single plane, an electrical pickup disposed to respond to vibratory movement of said bearing means in said single plane for generating an alternating current unbalance voltage proportional to the oscillation of said rotatable body, a variable reference impedance device having a movable tap, a generator producing a reference voltage of substantially the same frequency and wave form as the unbalance voltage, circuit means connecting said generator to energize said impedance device, circuit means connecting a tapped portion of said impedance device and said electrical pickup in series, with the voltage tapped from said portion of said impedance device opposed to said unbalance voltage of said electrical pickup to produce an error voltage, a bridge circuit having an input circuit and output terminals and a variable control device controlled by said error voltage for controlling bridge balance, motor means connected to the output terminals of said bridge circuit and energized by bridge unbalance voltage for moving said tap on said variable impedance device, a machine disposed to perform an operation on said body, and means actuated by said motor means for adjusting operation of said machine.

4. In a balancing machine for a rotatable body, the combination of, bearing means rotatably supporting said body for vibratory movement in a single plane, an electrical pickup disposed to respond to vibratory movement of said body in said single plane for generating an alternating current unbalance voltage proportional in magnitude to the unbalance of the body and having a frequency corresponding to the frequency of the oscillation of the body, a variable reference impedance device having a movable tap, a generator producing a reference voltage of the same frequency and substantially the same wave form as the unbalance voltage, circuit means connecting a tapped portion of said impedance device and said electrical pickup in series opposition to produce an error voltage, a bridge circuit having input terminals and output terminals and including in one leg a variable impedance control device controlled by said error voltage for controlling bridge balance, a drive motor connected to drive the tap of said impedance device, an energizing circuit for the motor, a relay having a coil connected to the output terminals of the bridge to be energized by the unbalance voltage of said bridge circuit and having contacts connected in the energizing circuit of said drive motor to control energization of said motor, and a mechanism driven by said drive motor to a position corresponding to the amount of unbalance of said body.

5. In a balancing machine for a rotatable body, the combination of, bearing means rotatably supporting said body for vibratory movement in a single plane, an electrical pickup disposed to respond to vibratory movement of said body in said single plane for generating an alternating current unbalance voltage proportional in magnitude to the unbalance of the body and having a frequency corresponding to the frequency of the oscillation of the body, a variable reference impedance device having a movable tap, generator means for producing a reference voltage of the same frequency and substantially the same wave form as the unbalance voltage and having an output circuit connected to energize said impedance device, circuit means connecting a tapped portion of said impedance device in series opposition with said electrical pickup and producing an error voltage, a bridge circuit having input terminals and output terminals, said bridge circuit having a tube connected in one leg of said bridge circuit, the impedance of the legs of said bridge circuit being such that the bridge is balanced when said tube is conducting, a control circuit connected with said circuit means for controlling the conduction of said tube in response to said error voltage, control means having an input circuit connected to the output terminals of said bridge circuit and having a mechanical output member connected to drive said tap on said impedance device in response to an unbalance of the bridge and thereby cause the voltage tapped from the variable reference impedance to equal the unbalance voltage, and a mechanism driven by said mechanical output member to a position corresponding to the amount of unbalance of said body.

6. In a balancing machine for a rotatable body, the combination of, bearing means rotatably supporting said body for vibratory movement in a single plane, an electrical pickup disposed to respond to vibratory movement of said body in said single plane for generating an alternating current unbalance voltage proportional in magnitude to the unbalance of the body and having a frequency corresponding to the frequency of the oscillation of the body, a variable reference impedance device having a movable tap, generator means for producing a voltage of the same frequency and substantially the same wave form as the unbalance voltage and having an output circuit connected to energize said impedance device, circuit means connecting a tapped portion of said reference impedance device and said electrical pickup in series opposition and producing an error voltage, a bridge circuit having input terminals and output terminals, said bridge circuit having a tube connected in one leg of said bridge circuit, the impedance of the legs of said bridge circuit being such that the bridge is balanced when said tube is conducting, means for controlling the conduction of said tube in response to said error voltage, relay means having a coil connected to the output terminals of said bridge circuit and having contacts, a drive motor having an energizing circuit controlled by said contacts, said drive motor being connected to drive the tap of said impedance device to cause the voltage tapped from the variable reference impedance to equal the unbalance voltage, and a mechanism driven by said drive motor to a position corresponding to the unbalance of said body.

7. A balancing machine comprising, bearing means for rotatably supporting a rotatable body for vibratory movement in a single plane, an electrical pickup disposed to respond to vibratory movement of said body in said single plane for producing an unbalance voltage, electrical means producing a reference voltage of the same frequency and substantially the same wave shape as said electrical pickup, a variable impedance device connected to said electrical means to be energized in dependence of said reference voltage and having a movable tap, a circuit connecting said electrical pickup and a tapped poriton of said impedance device is series opposition for producing an error voltage, a servo system having an input circuit connected to respond to said error voltage and having a drive motor connected to drive said tap, and a mechanism connected to and driven by said drive motor to a position corresponding to the unbalance of said body.

References Cited in the file of this patent
UNITED STATES PATENTS

| | | |
|---|---|---|
| 2,235,393 | Baker | Mar. 18, 1941 |
| 2,243,379 | Johnson | May 27, 1941 |
| 2,302,049 | Parker et al. | Nov. 17, 1942 |
| 2,315,578 | Baker | Apr. 6, 1943 |
| 2,331,733 | Senger | Oct. 12, 1943 |
| 2,375,159 | Wills | May 1, 1945 |
| 2,396,187 | Means et al. | Mar. 5, 1946 |
| 2,508,640 | Kuhlemeier | May 23, 1950 |

FOREIGN PATENTS

| | | |
|---|---|---|
| 845,422 | Germany | July 31, 1952 |